US005544536A

United States Patent [19]
Kim

[11] Patent Number: 5,544,536
[45] Date of Patent: Aug. 13, 1996

[54] MOUNTING ADAPTER FOR MAGNETIC REED SWITCH

[75] Inventor: Jae H. Kim, Kyunggi-Do, Rep. of Korea

[73] Assignee: K & J Electronics, Inc., Kyunggi-Do, Rep. of Korea

[21] Appl. No.: 510,604

[22] Filed: Aug. 3, 1995

[51] Int. Cl.⁶ ........................................ H01H 9/02
[52] U.S. Cl. .......................... 73/866.5; 335/202
[58] Field of Search ............ 73/866.5; 335/202; 340/547, 545; 248/634, 682; 200/61.62, 61.84, 295

[56] References Cited

U.S. PATENT DOCUMENTS 5,004,879  4/1991  Bernhardt et al. .................. 335/202

*Primary Examiner*—Robert Raevis

[57] ABSTRACT

An adapter for mounting a cylindrical shell containing a magnetic reed switch and an elongated permanent magnet in respective holes in a metal door and metal door frame. The purpose of the adapter is to enable the same reed switch and actuating magnet to be used for installation on a wooden door in which the elements are held in holes in the wooden door and wooden door frame in a press fit relationship, or in a metal door in which the elements are held in the metal door and metal door frame in a self-locking relationship, thereby precluding any need for producing different reed switches and actuating magnets for wooden and metal doors. The adapter has a particular configuration to fit around the cylindrical shell of the reed switch or the elongated permanent magnet, to hold the elements locked in place in the adapter, and the adapter itself is equipped with teeth, so that when it is inserted into the hole in the door or in the frame, the teeth engage and interlock with the door or frame.

10 Claims, 2 Drawing Sheets

5,544,536

MOUNTING ADAPTER FOR MAGNETIC REED SWITCH

BACKGROUND OF THE INVENTION

An improved mounting adapter is provided for a magnetic reed switch and operating magnet which serves to enable magnetic reed switches, constructed to be mounted in a press fit relationship in wooden door frames and in wooden doors, also to be mounted in a self-locking relationship in steel doors and in steel door frames. This obviates the need for producing a first set of switches and associated magnets for installation in wooden doors and frames, and a second set for installation in steel doors and frames.

Magnetic reed switches and actuating magnets are widely used in alarm systems to respond and activate an alarm whenever the door in which they are mounted is opened by an unauthorized person after the alarm has been set. Such alarm systems are described, for example, in U.S. Pat. Nos. 5,332,992; 4,990,898; and 4,903,010. A typical magnetic reed switch for use in such alarm systems is described, for example in U.S. Pat. No. 4,700,163.

The improved adapter of the invention in a specific application permits the same size reed switches and actuator magnets to be used in conjunction with wooden doors and steel doors. This obviates the need to manufacture one line of switches for wooden doors and a second line for steel doors.

Magnetic reed switches are normally capable of virtually unlimited cycles of operation before failure. This is because the contacts of the magnetic reed switches are not exposed to corrosion from atmospheric conditions and there are no bearings to fail. Encapsulated magnetic contact reed switches have been used in the past in security systems and in position sensing applications because of this longevity and reliability.

When such switches are used in position-sensing application they are usually activated by the magnetic field of a permanent magnet which is movable with respect to the switch itself. The magnet is attached to one of two relatively movable objects, such as a door, while the switch itself is mounted on the other, such as the door frame.

As pointed out above, an objective of the present invention is to provide an improved adapter which is constructed to permit such switches which are constructed to be mounted in press fit relationship in relatively movable objects formed, for example, of wood or other pliable material; also to be mounted in a self-locking relationship in relatively movable objects formed, for example, of steel or other non-pliable material.

A general objective of the invention, accordingly, is to provide an adapter which permits the same magnet reed switch and associated activating magnet assembly intended to be mounted in a press fit relationship in holes in a wooden door and wooden door frame; also to be mounted and locked in larger diameter holes in a steel door and steel door frame in a self-locking relationship, thereby obviating the need to produce one type of magnetic reed switch and magnet assembly for wooden doors and a second type for steel doors.

SUMMARY OF THE INVENTION

An adapter for mounting the elongated tubular shell of a magnetic reed switch and the tubular permanent magnet associated with the reed switch in larger diameter holes in a metal door and metal door frame in a self-locking relationship. The adapter of the invention has a particular configuration for engaging the tubular shell of the magnetic reed switch and the tubular permanent magnet in a resilient manner and to lock and hold the shell and magnet firmly in place; the adapter being equipped with teeth which are formed to interlock with the bores of the holes in the metal door and metal door frame.

DETAILED DESCRIPTION OF THE ILLUSTRATED EMBODIMENT

Figure 1:
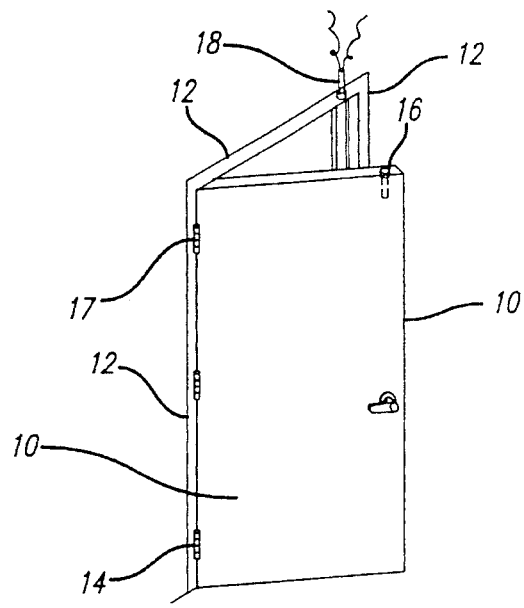
FIG. 1 is a schematic perspective representation of a wooden door and door frame and showing a tubular magnetic reed switch and an associated tubular permanent magnet mounted respectively in the door frame and in the door in position to cause the reed switch to be actuated whenever the door is opened.

FIG. 1 shows a door 10 composed, for example, of wood, with the door being hinged to a wooden door frame 12 by appropriate hinges 14. A tubular-shaped permanent magnet 16 is supported in a hole at the upper end of door 10 in a press fit relationship, and a tubular magnetic reed switch 18 is mounted in a hole in the door frame 12, likewise in a press fit relationship.

The tubular-shaped permanent magnet 16 and tubular magnetic reed switch 18 may, for example, be similar to those described in the patents referred to above.

The tubular-shaped permanent magnet 16 and tubular magnetic reed switch 18 are positioned so that when the door 10 is closed, the reed switch comes under the influence of the magnetic field from the permanent magnet 16 so as to control an alarm circuit (not shown) to deactivate an appropriate alarm. However, when the door 10 is opened, the field of the magnet 16 is removed from the reed switch 18, and the reed switch is activated so that alarm circuit will activate the alarm. In this way, the premises to which the door 10 provides access are protected, since the alarm is activated any time an unauthorized person opens the door.

Figure 2:
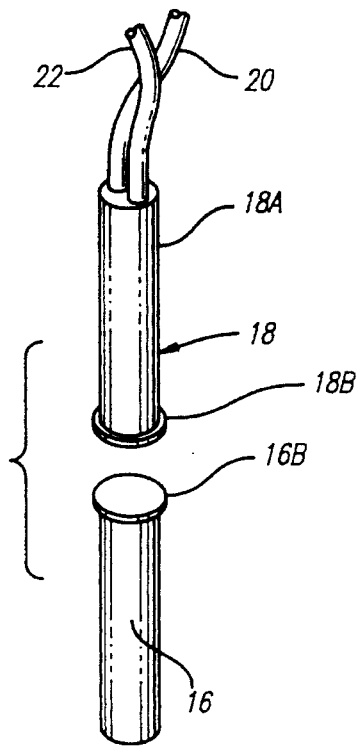
FIG. 2 is a perspective representation of a tubular magnetic reed switch and an associated tubular-shaped permanent magnet constructed in accordance with prior art practice to be mounted in the door and door frame, as shown in FIG. 1, so that the switch may be activated whenever the door is opened.

As shown in FIG. 2, the permanent magnet 16 has an elongated tubular configuration, and it has an increased diameter disc-shaped end which defines a peripheral lip 16B. When the permanent magnet 16 is mounted in the wooden door 10 of FIG. 1, it is driven down into a hole in the upper edge of the door until the peripheral lip defined by the end member 16B engages the surface of the upper edge of the door.

The reed switch 18 is housed in an elongated tubular shell 18A which has a lip 18B at its end that engages the surface of the wooden door frame 12 when the shell 18A is driven into a hole in the door frame. As indicated above, both the tubular shell 18A and the tubular-shaped permanent magnet 16 in the assembly of FIG. 1 are held in a press fit with the wood frame 12 and door 10. A pair of leads 20, 22 extend into the shell 18A to be connected to the reed switch 18 contained in the shell.

The reed switch assembly as described above may be used in conjunction with wooden door 10 and wooden door frame 12, as shown in FIG. 1. This is because the tubular permanent magnet 16 and the tubular reed switch 18 may be easily and conveniently mounted in holes of substantially the same diameter in the wooden door and in the door frame in a press fit relationship with the pliable material from which the door and frame are made.

As mentioned above, an object of the present invention is to provide a convenient adapter 30 (FIG. 7) which may be easily be fitted over and locked onto the tubular shell 18A of reed switch 18, and fitted over and locked onto the magnet 16, so that the reed switch and permanent magnet may be mounted in larger holes in non-pliable metal doors and metal door frames. The adapter of the invention is constructed to be self-locking with the material of the door and door frame, and also to be self-locking with the reed switch and permanent magnet.

Figure 7:
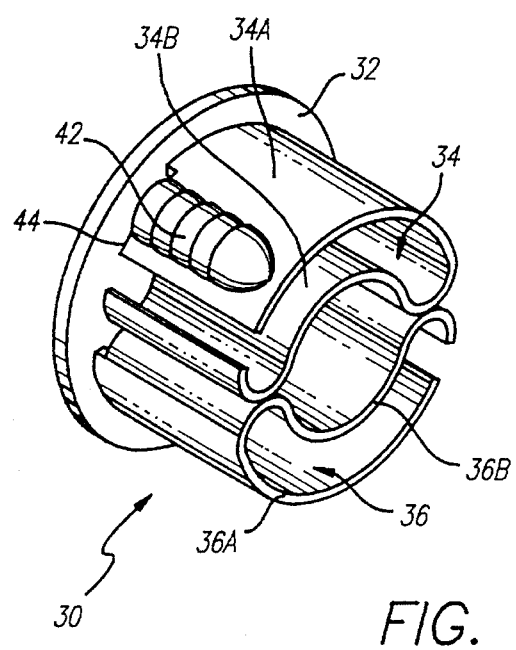
FIG. 7 is a perspective representation of the adapter taken from the rear and slightly above the adapter.

The adapter 30, as best shown in FIG. 7, is formed of any appropriate material, such as plastic, and it includes a rigid disc-shaped end member 32 of increased diameter with respect to the remainder of the adapter. First and second strip members 34 and 36 extend axially outwardly from the plane of the end member in spaced relationship with one another, and with the strip members being configured to have respective rigid arcuate portions 34A, 36A extending partially around the periphery of the end member, and attached to the end member. The strip members also have respective radially resilient arcuate portions 34B, 36B integral with the respective rigid arcuate portions 34A, 34B but detached from the end member 32 and displaced axially from the plane of the end member.

Figure 3:
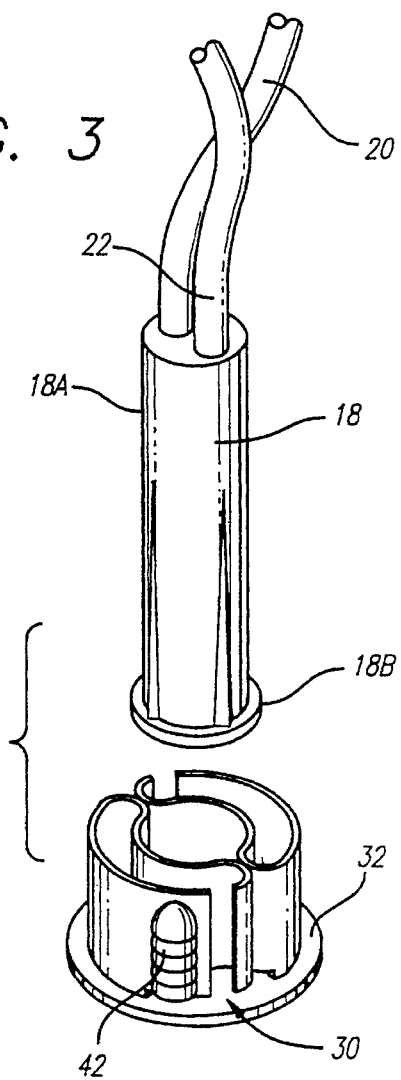
FIG. 3 is a perspective representation of the tubular reed switch and an adapter constructed in accordance with the present invention which is intended to be mounted on the end of the casing of the switch, after the casing has been inserted into the adapter.
Figure 4:
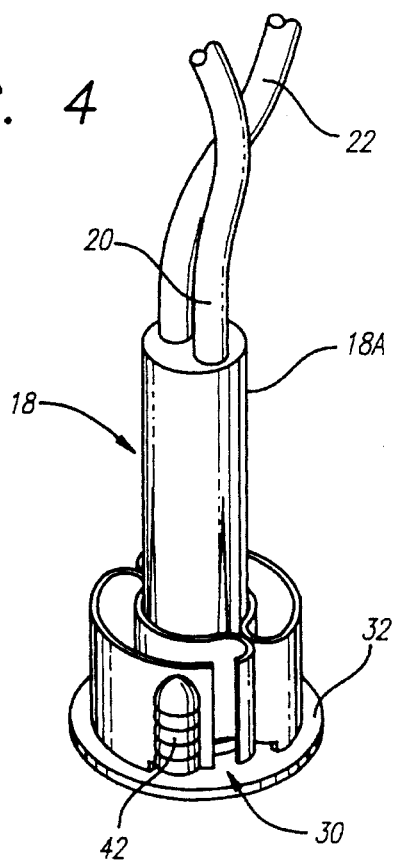
FIG. 4 is a perspective representation of the switch and adapter of FIG. 3 in an assembled condition.

The resilient bent-over arcuate portions 34B, 36B of the strip members face one another and define a substantially circular receptacle for receiving and for firmly retaining the magnet 16 or shell 18A of the reed switch 18, when, for example, the reed switch is inserted into the adapter from the rear, as shown in FIG. 3. When that is achieved, the lips 16B and 18B extend radially into the annular space between the inner edges of the resilient arcuate portions 34B, 36B, and into notches, such as notch 44, formed at the inner edges of the rigid arcuate portions 34A, 34B. In this manner, the reed switch 18 and magnet 16 are automatically locked in place after they have been inserted into the adapter 30.

Figure 5:
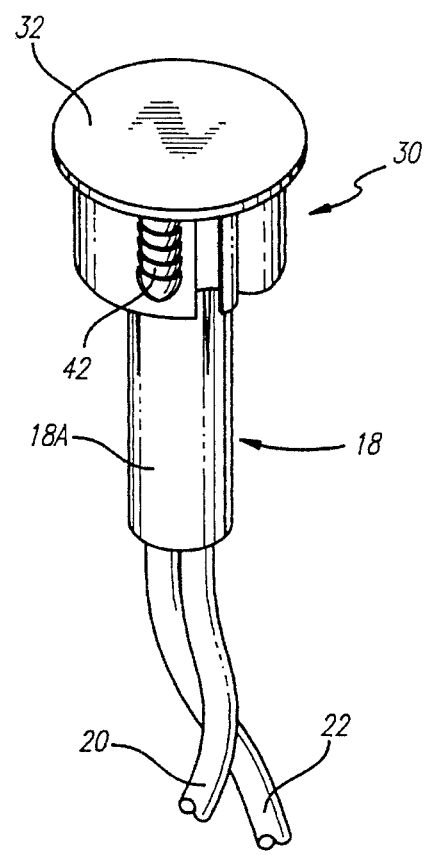
FIG. 5 is another perspective representation of the switch and adapter of FIG. 3 in an assembled condition, taken from the opposite end to the representation of FIG. 4.
Figure 6:
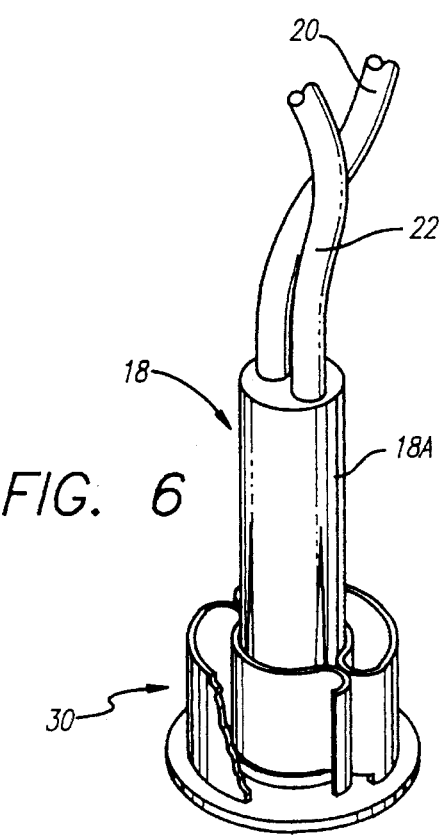
FIG. 6 is yet another perspective representation of the switch and adapter of FIG. 3 in an assembled condition, similar to the representation of FIG. 4, but with a portion of the adapter broken away to reveal the engagement of the switch and adapter.

As stated above, the insertion takes place from the rear of the adapter 30, as shown in FIG. 3. The construction is such that end member 32 completely covers and protects the end of reed switch 18 and magnet 16, as shown in FIG. 5, since it is imperforate.

The rigid arcuate portions 34A, 36A of the strip members 34 and 36 have an outer diameter which is slightly less than the diameters of the respective mounting holes formed in the metal door and metal door frame. A series of teeth 42 are formed on the outer surface of the rigid arcuate portions 34A, 36A. These teeth engage and interlock with the bores of the respective holes in the metal door and metal door frame and serve to retain the adapter, together with the magnet 16 and reed switch 18 in the door and in the door frame in a firmly locked relationship.

The invention provides, therefore, a simplified adapter which may be used conveniently to adapt a reed switch and magnet assembly to be mounted in a self-locking relationship a metal door and metal door frame.

While a particular embodiment of the invention has been shown and described, modifications may be made, and it is intended in the following claims to cover all such modifications which fall within the true spirit and scope of the invention.

I claim:

1. An adapter for mounting an elongated member of circular cross section in a hole in an object formed of non-pliable material, said adapter including: a rigid disc-shaped end member, first and second strip members extending axially outwardly from the plane of said end member in spaced relationship with one another, each of said strip members having a rigid arcuate portion secured at one of its edges to said end member adjacent to the periphery of said end member, and each of said strip members having a radially resilient bent-over arcuate portion integral with the corresponding one of said rigid arcuate portion but detached from said end member, the resilient arcuate portions of the strip members facing one another and defining an essentially circular receptacle for receiving one end of the elongated member and retaining the elongated member in the adapter in a position extending axially outwardly from the plane of said end member, the rigid arcuate portions of the strip members having an outer diameter selected to be received in the hole of the non-pliable object, and at least one tooth formed in the outer surface of at least one of the rigid arcuate portions to engage and interlock with the bore of the hole in the object so as to cause the elongated member to be retained therein.

2. The adapter defined in claim 1, and which includes a series of teeth formed in the outer surface of each of the rigid arcuate portions to engage and interlock with the bore of the hole in the object.

3. The adapter defined in claim 1, in which said elongated member is a tubular shell for receiving a magnetic reed switch.

4. The adapter defined in claim 1, in which said elongated member is a permanent magnet.

5. The adapter defined in claim 1, in which said object is a door.

6. The adapter defined in claim 1, in which said object is a door frame.

7. The adapter defined in claim 1, in which said adapter is formed of a plastic material.

8. The adapter defined in claim 1, in which the elongated member has an annular lip formed at one end, and the inner edges of said bent-over resilient arcuate portions of said strip members are spaced axially from the plane of said disc-shaped end member to provide an annular space for receiving said lip to lock said elongated member into interlocking relationship with the adapter.

9. The adapter defined in claim 8, in which the inner ends of said rigid arcuate portions of said strip members have respective notches therein to assist said resilient portions in providing an annular space for receiving said lip.

10. The adapter defined in claim 1, in which said end member is imperforate.

\* \* \* \* \*